United States Patent Office 3,033,753
Patented May 8, 1962

3,033,753
ERYTHROPOIETIC FACTOR PURIFICATION
Wilfrid F. White, Lombard, and Robert J. Schlueter, Chicago, Ill., assignors to the United States of America as represented by the United States Atomic Energy Commission
No Drawing. Filed Aug. 31, 1959, Ser. No. 837,309
5 Claims. (Cl. 167—74)

The invention relates to a novel method for removing impurities from erythropoietin, or as it is also called, the erythropoietic factor, more particularly for removing impurities from the product containing the factor described in the application of Wilfrid F. White, Eugene Goldwasser, Gotthard F. Weber, Richard Egan and Robert J. Schlueter, Serial No. 793,651, filed on February 16, 1959, which, in turn, is derived from the product described in the application of Wilfrid F. White and Gotthard F. Weber, Serial No. 741,471, filed June 12, 1958.

The existence of a blood plasma erythropoietic factor that is stimulatory to erythropoiesis in animals, including man, is well established. The presence, for example, of such a factor in the blood of human subjects affected with Cooley's anemia and sickle-cell anemia has been demonstrated by introducing into laboratory animals blood serum obtained from these subjects. The serum was found to produce a measurable augmentation in peripheral red cell, hemoglobin and reticulocyte levels of the test animals although not enough to be practical as a therapeutic agent. A similar result was obtained with blood serum from patients having polycythemia vera. Further substantiation of a plasma erythropoietic factor has been evidenced in extensive studies employing plasma of animals with induced anemia.

The presence of this substance in the plasma of anemic and polycythemic subjects has spurred investigation into the possibility of isolating or concentrating it free of impurities so as to make it practical for treatment of blood dyscrasias in animals, such as the red blood cell deficiency, or anemia, of radiation sickness which results from excessive radiation from nuclear reactors, or from other nuclear devices including nuclear weapons.

In the application Serial No. 741,471 above referred to a method is disclosed whereby the erythropoietic factor may be concentrated and purified to a degree exceeding that achieved by previously known methods. Briefly summarized, the method in said application Serial No. 741,471 comprises the treatment of animals, such as sheep, with a hemolytic agent such as phenylhydrazine hydrochloride to produce an artificial anemia or with a polycythemic agent such as cobalt chloride to produce an artificial polycythemia in the animal. Of the two agents mentioned, phenylhydrazine hydrochloride is preferred. The phenylhydrazine hydrochloride is administered to animals such as sheep in a treatment of several doses in an aqueous solution of 18 grams per liter. Since it has been found that there exists a logarithmic relationship which is positive between erythropoietic potency and the degree of anemia, or negative between the factor and the red blood cell level, it is advisable to keep a record of this level while the treatment is in progress in order to regulate the amounts administered. This can be done conveniently by means of a hematocrit centrifuge, a device that separates the clear plasma of the blood from the red cell portion by centrifugation and which has a scale in which the red blood cell portion may be read in terms of percent of the whole. Thus the erythropoietic potency rises as the hematocrit reading or value falls, remarkably so as the hematocrit value approaches 10 percent. The hematocrit value for each sheep may be determined prior to the first dosage and ordinarily a second determination is made after all the sheep have received two doses of the solution described; ordinarily this is at the rate of two millimeters for each ten pounds of body weight except for sheep showing subnormal initial hematocrit values in which case the dosage is adjusted to allow for the pre-existing anemia, the first two doses being two days apart on the first and third day of the treatment. After the two doses have been given, the differences, which are quite wide, between the reactivities of individual sheep to the phenylhydrazine hydrochloride begin to show up in the hematocrit readings, and it is advisable to increase or reduce the subsequent dose for those whose hematocrit values are notably high or low. A third dose is given on the fifth day based on the degree of anemia as shown by the hematocrit and on the sixth day the sheep are exsanguinated. Ordinarily after this type of controlled treatment the hematocrit value of pooled plasma groups of about 20 animals is about 10 to 20 percent, and the potency is one unit per milliliter, as compared to about 0.5 units for pooled plasmas of animals with only their body weights taken into account in determining their dosages. A unit of potency is the ability to increase on injection the blood incorporation of radioactive iron by starved rats equal to that brought about by the injection of five micromoles of cobaltous chloride. The sheep blood obtained by the exsanguination described is treated with an anticoagulant and centrifuged in order to separate the red corpuscles from the plasma. The plasma is then adjusted to a pH in the range from about 3.5 to about 8.5, preferably from about 4.2 to 4.8, and dialyzed against water until the volume ratio becomes about one part plasma to about three parts water; the preferred amount of dialysis brings the salt concentration of the plasma to about .03 to about .04 molar, with optimum results being achieved at a salt concentration of about .0375 molar. Any precipitate formed after this operation is removed by conventional methods, and the dialyzed, pH-adjusted plasma is then brought into contact with an ion exchange material having a preferential adsorption of the erythropoietic factor over foreign protein ingredients present in the plasma. This can be done either in a batch operation or in a column.

Said application Serial No. 741,471 states in detail the ion exchange materials which may be used for the process of the invention of that application, but the preferred material is anion exchange material. Particularly satisfactory materials are the insoluble, open chain, high molecular weight polysaccharides containing anionic exchange groups. Insoluble alkyl amino derivatives of cellulose such as the diethyl amino ethyl ether of cellulose, commonly known as DEAE, and prepared by condensing sodium cellulose with 2-chlorotriethylamine has been found particularly satisfactory. The contact of the dialyzed, pH-adjusted plasma with the ion exchange material under the conditions set forth results in the preferential sorption of the erythropoietic factor by the ion exchange material; when this is complete the factor is eluted from the ion exchange material with a suitably buffered solution with a higher salt concentration than that of the dialyzed, pH-adjusted plasma prior to its contact with the ion exchange material. An example of such an eluting solution is one having sodium chloride concentration from about 0.1 molar to about 0.5 molar and a sodium phosphate concentration of about 0.05 molar to about 0.2 molar. After such elution has proceeded long enough to remove most of the erythropoietic factor from the ion exchange material, as can be determined from optical density measurements with a spectrophotometer, the eluted solution is then dialyzed against water, and finally the water in the resulting dialyzed solution is separated from the solids by the well-known freezing and sublimation process of lyophilization.

Application Serial No. 793,651 discloses that while the product of application Serial No. 741,471, or any alternate method of making it, cannot be improved by repeated contacts with DEAE or other anion exchange material so as to cause its sorption, it can be improved by first subjecting it to a reverse of this process, namely, by causing a solution thereof to flow under certain conditions of ionic strength and pH through a column of cation exchange material (of opposite type to that of DEAE) whereby the desired factor is not sorbed but passed through while undesirable components are sorbed by the cation exchange material of the column; thereafter, under other certain conditions of ionic strength and pH, the method of sorption by DEAE, or other similar anion exchange materials, originally found to be ineffective for further purification, becomes effective, and the desired erythropoietic factor may be sorbed by and then selectively removed from the DEAE or other similar anion exchange material by a carefully controlled gradient elution.

The DEAE or other similar anion exchange material unfortunately sorbs not only the erythropoietic factor but other materials as well, some of which are antigenic, and therefore, after the sorption is complete, the gradient elution method of removal must be used. In carrying this out the eluting liquid is given a constantly increasing normality with respect to sodium chloride by mixing two solutions together in a mixing chamber above the column, and at the same time dividing the eluant from the bottom of the column into a large number of small fractions, each of which is subjected to optical density measurements in order to determine precisely at what point in the elution the desired factor is carried from the column by the eluant. Due to small variations between lots of blood plasma starting material, as well as to the variations of the temperatures and barometric pressure of the environment, it is not possible to standardize the conditions of the elution so as to dispense with the gradient feature and the accompanying fractionating and individual fraction measurements. For this reason, the method of the application Serial No. 793,651 is necessarily expensive, particularly when carried out on a scale of any considerable size.

While the final product of the method of application Serial No. 793,651 has greatly increased erythropoietic purity and potency over the product of methods theretofore known, it would be desirable to discover a product of even greater purity and potency, if possible, for obvious reasons.

It is accordingly an object of the present invention to show a product of increased erythropoietic purity and potency.

It is a further object of the invention to show a method of producing such a product by the removal of impurities associated with the erythropoietic factor.

It is a further object to show a method of producing such a product from an extract derived from anemic ovine blood plasma.

It is a further object to show such a method without the need for a gradient elution and dividing the eluant into fractions.

All the foregoing objects are attained by our discovery that, contrary to the accepted belief that the erythropoietic factor may be efficiently sorbed only anion exchange materials, it can, under certain conditions of pH not only be sorbed by cation exchange material efficiently, but even sorbed thereon to the practical exclusion of all associated blood plasma impurities so that it may be simply eluted by a solution of constant composition, and without the need for a gradient elution or any fractionation of the eluant and measuring of the properties of fractions.

In carrying out our invention we can, of course, take as our starting material the final product of application Serial No. 793,651, which has been through the gradient elution-eluant fractionation process above referred to. We can also apply the process of our present invention to blood plasma extracts containing the erythropoietic factor produced by a number of other methods, so long as interfering substances are not present. However, the invention mainly contemplates, and we prefer, using as a starting material the intermediate product produced by the "first stage" of application Serial No. 793,651, after the starting solution of the process of that application has been run through the column of cation exchange material, but before it is put through the column of anion exchange material from which it is removed by the gradient elution-eluant fractionation method of the "second stage" of that application. In other words, the process of the present application may be regarded as an improvement on the method of application Serial No. 793,651, either as a further stage after the completion of both the first and second stages of that application, or, preferably, as a substitute for the second stage which may then be omitted entirely with both increased erythropoietic potency of the final product, and the economic savings resulting from the elimination of the complicated, expensive gradient elution-eluant fractionation technique.

The intermediate product referred to is an aqueous solution containing the erythropoietic factor and its associated ovine blood plasma impurities and the following inorganic components: 0.02 M $NaH_2PO_4$ and 0.18 M NaCl. Due to the criticality of the first stage operation, these molarities never vary greatly if at all with this starting material, and its pH for the same reason is almost exactly at 6.0. Due to practical considerations of keeping it is usually rather cold when received and should first be allowed to reach room temperature by standing, after which a mineral acid, preferably 9 N $H_3PO_4$, is slowly and cautiously added with stirring to lower the pH of the solution below 5.3, and preferably to about 5.0. Too rapid a rate of acid addition is apt to damage the rather delicate biochemical components of the solution, but on the other hand, the addition of quite a concentrated acid is desirable in order to keep the solution from becoming too dilute. If a starting material other than the preferred starting material is used, the pH should be adjusted to the same level as the first step of the process.

The selection and equilibration of the cation exchange material should, of course, be done in advance of the treatment of the starting material just described in order that the material may be processed as expeditiously as possible, as is true of all biochemical operations. Any cation exchange material may be used which is mildly acidic after being equilibrated by a solution of excess hydrogen ions; we prefer a resin having as its acidic functions carboxylic acid radicals. Strongly acidic exchange materials are to be avoided because of their destructive effect on protein and protein-like materials, but any mildly acidic cation exchange material whose acidic character is comparable to that produced by carboxylic functional groups may be used. The type of skeleton of the cation exchange material may vary widely; it may be cellulose, acrylic, methacrylic or other substituted acrylic polymers or copolymers, a phenol, resorcinol, ortho-cresol, para-cresol, or other phenolic condensation product with formaldehyde or some other aldehyde, vinyl, divinyl, derived from vinylidene or a vinyl-vinylidene copolymer, or any other structure that does not interfere with the cation exchange ability and mild acidity required. We have found to be suitable the resins Amberlite IRC–50 and Amberlite XE–97, which are cation exchange materials of different particle sizes derived from a substituted acrylic copolymer with an allyl compound condensation product having carboxyl functional groups; their structure and method of making are set forth in Example 15 of U.S. Patent No. 2,340,111. Amberlite XE–97, which is the same as IRC–50 except that it has the finer particle size of the two, is preferred.

Cation exchange resins ordinarily come from the manufacturer in their acidic conditions and this is true of both IRC-50 and XE-97. The analytical grade is chemically and biologically pure and may be put directly in the column, the size of which will, of course, vary depending on the amount of material to be processed; for carrying it out on a laboratory scale, a column 4 inches in diameter with XE-97 45 cm. high is sufficiently large to treat 4.5 liters of our preferred starting material. We prefer a resin having a particle size of 100 to 200 mesh; this makes superatmospheric pressure unnecessary when the column is in use, gravity being sufficient to cause the solution to flow through the column. After the resin has been placed in the column it should be thoroughly equilibrated to lower its pH to within the range of 4.5 to 5.1, preferably to 5.0, by an aqueous buffer solution, the following being preferred: 0.02 M $NaH_2PO_4$ and 0.18 M NaCl. The pH of this solution is 5.0.

After the resin has been equilibrated and allowed to drain thoroughly but before any appreciable drying from evaporation has taken place, the starting solution containing the erythropoietic factor is placed on top of the column and allowed to percolate therethrough, the effluent of the column being discarded. If the preferred particle size is used, gravity alone is sufficient to bring the solution through the column, and this rate of flow is sufficient to treat our preferred starting material; of course if resins of smaller particle size are used, or if other solutions are being treated, the rate of flow may be adjusted by putting the top of the column under super-atmospheric pressure, as is known in the art.

Of course, the contact between the solution and the cation exchange material may be carried out batch-wise in a flask or other vessel, but column contact is more convenient and is preferred.

After the solution containing the erythropoietic factor has subsided into the bed of resin in the column, an approximately equal volume of the buffer solution should be added to the top of the column, and due to the chromatographic effect it will act piston-like to force the unsorbed part of the starting solution through the bottom of the column. As a precautionary measure we prefer, after the buffer solution has subsided into the main resin bed, to add about half as much water as the buffer solution, and then permit the column to drain thoroughly. The solid material of the column is then removed to another vessel and enough water added to make a suspension; we prefer a rather thick suspension with about the consistency of paint; in the case of the 45 cm. high column mentioned about 4 liters of water is sufficient.

At this point, the resin of this suspension has bound to it the erythropoietic factor and no substantial amounts of any other biochemical substances so far as present scientific methods are capable of disclosing; a number of theories have been offered to explain why the factor is bound to the resin under the circumstances, whereas under the slightly less acid conditions of the first stage of application Serial No. 793,651, it passes through the column unsorbed, but we are as yet uncertain as to their validity and do not wish to be bound by any theoretical explanation. In any event, we have established the operability of our invention empirically by many actual trials and animal assays, which will be set forth in detail later on, with closely reproducible results.

In order to recover the erythropoietic factor from the resin the pH of the suspension should be varied to above 5.3, preferably to about 6.0, by carefully adding alkali, preferably 5 N NaOH, with stirring. In order to speed the removal the suspension should be strongly agitated; on the laboratory scale shaking in a closed vessel gives best results. The solution is then filtered with suction, the cake washed with water and the filtrate thoroughly dialyzed against water in the cold. The dialyzate is then freeze-dried by the well-known process of lyophilization, give a power of a slightly buff color which will have from 5 to 10 units of potency per gram.

The potency referred to is established as follows: experimental rats weighing 175 to 200 grams are starved by withdrawing all food but permitting them to drink water ad libitum throughout the experiment. After 30 hours 2 ml. of an aqueous solution of the product of the invention having a concentration of 0.075 mg. per ml. is injected intravenously. Twenty-four hours later, a duplicate injection is made, making a total dosage per rat of 0.30 mg. Twenty-four hours after the second dose, 1 ml. of a ferric ($Fe^{59}$) citrate solution having a radio-activity of 1 to 2 microcuries per ml. is injected in the same manner. Sixteen hours after the radioiron administration a 1 ml. sample of blood is taken by cardiac puncture from each rat and a radioactive count thereof made in a scintillation counter. Since it is known that the uptake of iron into the blood is proportional to the erythropoietic factor present in the blood, and the rest of the iron, not so taken up, is excreted meanwhile in the urine, the amount of erythropoietic factor may be calculated from the observed scintillation count, as is known in the art. (See Proc. Soc. Exp. Biol. and Med., 1957, V 94, 237.) In establishing the arbitrary "unit" of potency, a similar procedure is followed except that instead of the product of the invention two doses of 1 ml. each of an aqueous solution of cobaltous chloride are injected, of a concentration of 2.5 micromoles per ml. The increase in erythropoietic factor activity thus brought about is a unit of potency; the product of the invention when measured in the manner explained has from 5 to 10 units of potency per mg. after the final lyophilization mentioned. Optionally this can be about doubled by removing the inorganic salts present which can be simply done by making an aqueous solution and bringing it into contact with a "mixed bed resin," or an ion exchange material that sorbs both inorganic anions and cations but does not sorb biochemical compounds. Any of the common resins of this type such as those having both amine groups and sulfonic acid groups may be used; Amberlite MB-1, an acrylic skeleton resin of this type, is preferred for this purpose.

*Example*

A glass cylindrical column 4 inches in diameter was filled with XE-97 resin of a particle size of 100 to 200 mesh to a height of 45 cm. and equilibrated overnight with an aqueous solution of .02 M $NaH_2PO_4$ and .18 M NaCl having a pH of 5.0, and drained from the column and discarded. 4.5 liters of the effluent solution from the cation exchange column of the first stage of application Serial No. 793,651, was warmed to room temperature and its pH of 6.0 reduced to 5.0 by adding 9 N $H_3PO_4$ slowly with stirring. The resulting solution was then placed on top of the column and after it had subsided into the resin 4.5 liters of fresh buffer solution was placed on top of the column and after it had subsided into the resin 2.25 ml. of distilled water was placed on top of the column, and the column was permitted to drain thoroughly. The solid material of the column was then removed to a flask and 4 liters of distilled water were added to make a suspension with about the consistency of ordinary paint; 5 N NaOH was then slowly added with much shaking until the pH of the suspension rose to 6.05. The suspension was then filtered with suction and the filter cake washed with 4 liters of distilled water and the entire filtrate was then dialyzed overnight against water in the cold. The dialyzate was then freeze-dried in a lyophilization apparatus and yielded 4 g. of a buff colored powder.

The powder was dissolved in distilled water to make a solution of .075 mg. per ml. Normal, two month old male Sprague-Dawley rats weighing 175 to 200 mg. were acclimated to their environment for four days, and all their food thereafter was withdrawn, but water was supplied ad libitum. After 30 hours fasting, a first 2 ml. dose of the powder solution was injected into the tail vein under light ether anesthesia. Twenty-four hours later, a duplicate injection was made. Twenty-four hours after the second injection, 1 ml. of $Fe^{59}$ citrate solution with a radioactivity of 1 to 2 microcuries per ml. was introduced into the tail vein of each rat. Sixteen hours after the radioiron administration a 1 ml. sample of blood was taken from each rat by cardiac puncture. Activity of the $Fe^{59}$ in the blood sample was determined by counting in a well-type scintillation counter. Individual responses of the rats averaged 11.70 percent of $Fe^{59}$ taken up by the blood, from which potency of the sample was calculated at 5.1 units per mg.

What is claimed is:

1. In the method of purifying the erythropoietic factor wherein anemic sheep blood plasma is put into contact with an anion exchange resin, and then with a cation exchange resin at a pH of about 6.0, the improvement consisting of bringing a solution containing the factor into contact with a cation exchange material at a pH of 5.0–5.3 during said contact.

2. The improvement of claim 1 where the cation exchange character of the material is due to carboxylic functional groups.

3. The improvement of claim 1 where the cation exchange material is a substituted acrylic copolymer with an allyl compound having carboxylic functional groups.

4. A method of purifying and isolating an extract containing the erythropoietic factor comprising equilibrating a column of 100 to 200 mesh ion exchange resin consisting of a substituted acrylic copolymer with an allyl compound having carboxylic functional groups, with an aqueous buffer solution of about .02 M $NaH_2PO_4$ and .18 M NaCl, adding 9 N $H_3PO_4$ to a partially purified aqueous solution containing the factor until its pH is reduced to 5.0 and then placing it on the column and permitting it to subside within the resin of the column, then placing about an equal amount of the buffer solution on the column and permitting it to subside within the resin of the column, then placing about half as much pure water on the column as the buffer solution and permitting it to subside within the resin of the column until all effluent drains therefrom; then making an aqueous suspension of the solid material of the column, then adding 5 N NaOH slowly and with agitation to the suspension until its pH is raised to about 6.05; then filtering the suspension with suction; then washing the filter cake with water; then dialyzing the filtrate against water and then lyophilizing the dialyzate to produce a purified solid extract containing the erythropoietic factor.

5. A method of producing a blood plasma erythropoietic factor-containing product, comprising feeding phenylhydrazine hydrochloride to sheep in an amount sufficient to produce severe anemia, withdrawing blood from the sheep and centrifuging it to separate the plasma from the red cell portion, dialyzing the plasma and then bringing it into contact with an anion exchange resin prepared by condensing sodium cellulose with 2-chlorotriethylamine, eluting the anion exchange resin with an aqueous solution of about 0.1 to 0.5 M sodium chloride and about 0.05 to 0.2 M sodium phosphate, dialyzing the eluate against water, lyophilizing the dialyzate, dissolving the lyophilizate in water to make a solution of about 10% and then introducing it to the top of a first column containing a cation exchange resin consisting of a substituted acrylic copolymer with an allyl compound having carboxylic acid functional groups which has been previously equilibrated to about 0.15 to 0.20 molarity with respect to sodium chloride and about 0.02 molarity with respect to sodium phosphate, collecting the eluate from the column of cation exchange resin, equilibrating a second column 100 to 200 mesh of the same cation exchange resin with an aqueous buffer solution of about 0.2 M $NaH_2PO_4$ and .18 M NaCl; then adding 9 N $H_3PO_4$ to the eluate until its pH is reduced to 5.0 and then placing it on the second column and permitting it to subside within the resin of the second column, then placing about an equal amount of the buffer solution on the second column and permitting it to subside within the resin of the second column, then placing about half as much pure water on the second column as the buffer solution and permitting it to subside within the resin of the second column, then making a suspension of the solid material of the second column and then adding 5 N NaOH slowly and with agitation to the suspension until its pH is raised to about 6.05; then filtering the suspension with suction; then washing the filter cake with water; then dialyzing the filtrate against water and then lyophylizing it to produce a purified solid extract containing the erythropoietic factor.

References Cited in the file of this patent

J.A.C.S., vol. 78, 1956, pages 751–763.
Rambach: Blood, vol. 12, December 1957, pages 1101–13.
Gordon: P.S.E.B.M., vol. 86, 1954, pages 255–58.
J.A.C.S., Feb 5, 1955, vol 77, pages 742–45